United States Patent [19]

Oda et al.

[11] Patent Number: 4,470,893
[45] Date of Patent: * Sep. 11, 1984

[54] METHOD FOR WATER ELECTROLYSIS

[75] Inventors: Yoshio Oda; Hiroshi Otouma; Eiji Endoh, all of Yokohama, Japan

[73] Assignee: Asahi Glass Company Ltd., Tokyo, Japan

[*] Notice: The portion of the term of this patent subsequent to Sep. 22, 1998 has been disclaimed.

[21] Appl. No.: 382,771

[22] Filed: May 27, 1982

[30] Foreign Application Priority Data

| Jun. 1, 1981 [JP] | Japan | 56-82541 |
| Jun. 1, 1981 [JP] | Japan | 56-82542 |
| Jun. 2, 1981 [JP] | Japan | 56-83829 |

[51] Int. Cl.$^3$ .................. C25B 1/04; C25B 1/10; C25B 11/06
[52] U.S. Cl. .................. 204/129; 204/290 R; 204/292; 204/293
[58] Field of Search .......... 204/292, 293, 129, 16, 204/40, 47, 290 R

[56] References Cited

U.S. PATENT DOCUMENTS

| 4,039,409 | 8/1977 | La Conti et al. | 204/129 |
| 4,065,366 | 12/1977 | Oda et al. | 204/128 |
| 4,135,996 | 1/1979 | Bouy et al. | 204/98 |
| 4,177,118 | 12/1979 | Campbell | 204/129 |
| 4,255,247 | 3/1981 | Oda et al. | 204/293 |
| 4,290,859 | 9/1981 | Oda et al. | 204/16 |
| 4,302,322 | 11/1981 | Oda et al. | 204/16 |

FOREIGN PATENT DOCUMENTS

| 48598 | 6/1977 | Japan | 204/98 |
| 112785 | 4/1979 | Japan | 204/16 |
| 19229 | 8/1979 | Japan | 204/293 |

*Primary Examiner*—R. L. Andrews
*Attorney, Agent, or Firm*—Oblon, Fisher, Spivak, McClelland & Maier

[57] ABSTRACT

A method for water electrolysis in an electrolytic cell provided with an anode and a cathode, and cation exchange membrane disposed therebetween. The anode comprises a metal layer formed on an electrode substrate and composed of at least one metal selected from nickel, cobalt and silver, and said metal layer contains partially exposed particles composed essentially of at least one metal selected from nickel, cobalt and silver.

3 Claims, 2 Drawing Figures

F I G. 1
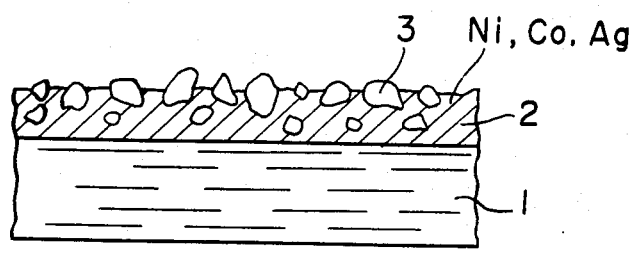
F I G. 2
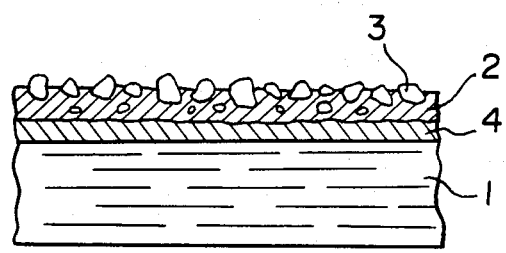

METHOD FOR WATER ELECTROLYSIS

BACKGROUND OF THE INVENTION

1. Field of the Invention

The present invention relates to a method for water electrolysis, and particularly to a method for water electrolysis using an anode having a low oxygen overvoltage and superior durability.

2. Description of the Prior Art

In view of the recent energy shortage, attention has been drawn to hydrogen as a new energy source replacing petroleum. Industrial methods for the production of hydrogen are generally classified into electrolysis of water and gasification of cokes or petroleum. The electrolysis of water has an advantage that the starting material, i.e. water is readily available, but it has at the same time various difficulties such as the requirement of equipment for electrolysis, the fact that the electrolytic solution is readily degraded by carbonation, and that a large installation area and high costs are required for installations. On the other hand, the gasification of cokes or petroleum usually involves cumbersome operations and requires a large scale installations thus leading to high installation costs.

In an attempt to overcome the above difficulties, it has recently been proposed to produce hydrogen by electrolyzing water in an electrolytic cell wherein a cation exchange membrane is utilized.

It is known to use so-called ion exchange membrane electrolysis for electrolysis of sodium chloride (brine). However, in the electrolysis of water which is conducted by supplying an aqueous alkaline solution such as an aqueous solution of e.g. potassium hydroxide to an anode compartment partitioned by a cation exchange membrane and supplying water or a dilute aqueous alkaline solution to the cathode compartment, the conditions of the anode compartment are quite different from the conditions of the anode compartment in the electrolysis of sodium chloride. Nickel is considered to be particularly useful for an anode used under such an alkaline condition.

On the other hand, an anode made essentially of a noble metal such as platinum, palladium or ruthenium, or an alloy or oxide thereof which is used in the conventional electrolysis of sodium chloride, is not practically useful as an anode for the electrolysis of water because of the following problems.

Namely, ruthenium and palladium tend to be gradually dissolved by the effect of the alkaline solution and thus they are inferior with respect to durability.

SUMMARY OF THE INVENTION

The present inventors have conducted extensive research on an anode for the electrolysis of water composed essentially of nickel, cobalt or silver, and as a result have surprisingly found a method whereby water can be electrolyzed at a low voltage.

Namely, the present invention provides a method for electrolyzing water in a electrolytic cell provided with an anode and a cathode and a cation exchange membrane disposed therebetween, wherein said anode comprises a metal layer formed on an electrode substrate and is composed of at least one metal selected from nickel, cobalt and silver, and said metal layer contains partially exposed particles composed essentially of at least one metal selected from nickel, cobalt and silver.

BRIEF DESCRIPTION OF THE DRAWINGS

FIG. 1 is a cross sectional view of a surface portion of one embodiment of the anode according to the present invention.

FIG. 2 is a cross sectional view of a surface portion of another embodiment of the anode according to the present invention.

DETAILED DESCRIPTION OF THE PREFERRED EMBODIMENTS

A cathode commonly used in the conventional electrolysis of sodium chloride, for instance a cathode obtained by subjecting iron or stainless steel to etching treatment, may be used as the cathode in the present invention. It is also possible to use as the cathode, the anode according to the present invention.

As the cation exchange membrane, a known fluorine-containing cation exchange membrane may be used. In view of the durability and the low cell voltage for electrolysis, a perfluoro fluorinated carbon membrane having carboxylic acid groups as the ion exchange groups (for instance, the ones disclosed in Japanese Laid-Open Patent Application Nos. 140899/76 and 48598/77) is particularly preferred.

The anode to be used in the present invention must have a layer composed of at least one metal selected from nickel, cobalt and silver formed on an electrode substrate and which layer contains particles composed essentially of at least one metal selected from nickel, cobalt and silver, the particles being partially exposed on the surface of the layer. On the surface of the electrode, numerous particles are bonded, and macroscopically the electrode surface presents a fine porous structure.

Thus, the anode has numerous particles composed essentially of nickel, cobalt or silver on the electrode surface and the electrode surface has a fine porous structure as mentioned above. Accordingly, the anode has a large electrochemically active surface area. By virtue of the synergetic effect, it is thereby possible to effectively reduce the oxygen overvoltage. The particles are firmly fixed to the electrode surface by the layer composed of a metal and highly resistant against degradation, whereby it is possible to remarkably prolong the period for maintaining the low oxygen overvoltage.

Further, by virtue of the above-mentioned effect, the electrode performance as the initial stage can also be improved.

The electrode substrate can be made of a suitable electric conductive metal such as Ti, Zr, Fe, Ni, V, Mo, Cu, Ag, Mn, platinum group metals, graphite and Cr and alloys thereof. Preferred among them are Fe and Fe-alloys (a Fe-Ni alloy, a Fe-Cr alloy and a Fe-Ni-Cr alloy), Ni and Ni-alloys (a Ni-Cu alloy and a Ni-Cr alloy), Cu and Cu-alloys. Particularly preferred materials for the electrode substrate are Fe, Cu, Ni, Fe-Ni alloys and Fe-Ni-Cr-alloys.

The structure of the electrode substrate may be adapted to have an optional size and dimensions suitable for the structure of the particular electrode to be used. The electrode substrate may be a plate, foraminous net (such as an expanded metal) or parallel screen the shape of which may be flat, curved or cylindrical.

The particles composed essentially of a metal selected from nickel, cobalt and silver and serving as electrochemically active anode particles, may be made of such a metal itself or a metal composition or alloy having said metal as the main component, or they may be composite particles having a surface layer composed of such a metal or alloy.

When the metal composition or alloy having said metal as the main component is used, a metal which does not substantially adversely affect the reduction of the oxygen overvoltage such as Al, Zn, Mg, Sn, Si or Sb may be used as the additional component, depending upon the content of the additional component.

The average particle size of the particles is usually in a range of from 0.1 to 100μ though it depends upon the dispersibility of the particles. From the viewpoint of the porosity of the surface of the electrode, the average particle size is preferably in a range of from 0.9 to 50μ especially from 1 to 30μ.

The particles are preferably porous on their surfaces so as to give a lower oxygen overvoltage.

The term "porous on their surfaces" means that the surfaces of the particles exposed on the metal layer are porous and does not necessarily mean that the entire surfaces of the particles are porous.

In general, the greater the porosity, the better. However, an excessive porosity leads to a decrease of the mechanical strength of the particles. Accordingly, the porosity is preferably within a range of from 20 to 90%. Within this range, a more preferable range is from 35 to 85%, especially from 50 to 80%.

The porosity is measured by the conventional water substituting method.

Various methods may be employed for forming the porous surface such as a method of removing metals other than Ni, Co and Ag from an alloy having Ni, Co or Ag as the main component to form the porous surface; a method of converting Ni, Co or Ag into carbonyl compound thereof and decomposing thermally the carbonyl compound to form the porous surface; a method of decomposing thermally an organic acid salt of Ni, Co or Ag to form the porous surface; or a method of heating an oxide of Ni, Co or Ag in hydrogen reducing atmosphere to form the porous surface.

Considering processability, it is preferable to employ the method of removing metals other than Ni, Co and Ag from an alloy having Ni, Co or Ag as the main component. In such a method, the particles are made of an alloy comprising a first metal component selected from the group consisting of Ni, Co and Ag and a second metal component selected from the group consisting of Al, Zn, Mg, Si, Sb and Sn and at least a part of the second metal component is removed from the alloy by treatment with an alkali metal hydroxide.

Examples of such alloys include Ni-Al alloys, Ni-Zn alloys, Ni-Mg alloys, Ni-Sn alloys, Ni-Si alloys, Co-Al alloys, Co-Zn alloys, Co-Mg alloys, Co-Si alloys, Co-Sn alloys, Ag-Al alloys, Ag-Zn alloys, Ag-Mg alloys, Ag-Sn alloys, and Ag-Si alloys.

Considering availability, it is preferable to use Ni-Al alloys, Co-Al alloys or Ag-Al alloys. Specifically, such peferred alloys are unleached Raney nickel, Raney cobalt or Raney silver. Among them, especially preferred is the Ni-Al alloys, specifically unleached Raney nickel.

The metals of the metal layer for bonding the particles are metal having high alkaline resistance and being capable of firmly bonding the particles and are preferably selected from the group consisting of Ni, Co and Ag, especially the same metal as the metal of the essential component of the particles.

The thickness of the metal layer according to the present invention may vary depending upon the particle size of the particles employed, but it is usually within a range of from 20 to 200μ preferably from 25 to 150μ, especially from 30 to 100μ since the particles are bonded to the metal layer on the electrode substrate so that they are partially embedded in the metal layer.

For the structure to be easily understood, FIG. 1 shows a sectional view of the surface of the electrode of the present invention.

As shown in FIG. 1, the metal layer (2) is formed on an electrode substrate (1) and particles (3) are firmly bonded to the metal layer so as to expose parts of the particles above the metal layer.

The proportion of the particles in the metal layer (2) is preferably from 5 to 80 wt.%, more preferably from 10 to 50 wt.%.

It is also preferable to form an intermediate layer made of a metal selected from the group consisting of Ni, Co, Ag and Cu between the electrode substrate and the metal layer containing the particles whereby the durability of the electrode can further be improved.

Such an intermediate layer can be made of the same or different metal as the metal layer and is preferably made of the same metal from the viewpoint of the bonding strength to the metal layer.

A thickness of the intermediate layer is usually within a range of from 5 to 100μ preferably from 20 to 80μ especially from 30 to 50μ.

For such a structure to be easily understood, FIG. 2 shows a cross sectional view of an electrode having an intermediate layer.

In FIG. 2, the electrode comprises the electrode substrate (1), the intermediate layer (4), the metal layer (2) containing particles and the particles (3).

As shown in FIGS. 1 and 2, when the surface of the electrode is observed microscopically, many particles are exposed on the electrode surface, but when observed macroscopically, the surface layer is porous.

The degree of the porosity relates to the reduction of oxygen overvoltage and a satisfactory result is obtainable when an electrical double layer capacity (a value of a double-layer capacity) is more than 1000 $\mu F/cm^2$. Within the above range, said electrical double layer capacity is preferably more than 2000 $\mu F/cm^2$ especially more than 5000 $\mu F/cm^2$.

The electrical double layer capacity is an electrostatic capacity of electric double layers formed by positive and negative ions relatively distributed with a short distance from each other near the surface of the electrode when the electrode is immersed in an electrolytic solution and it is measured as a differential capacity.

The capacity increases with an increase of the surface area of the electrode. Thus, the electrical double layer capacity of the surface of the electrode increases with an increase of the porosity of the surface as the surface area of the electrode is thereby increased. The electrochemically effective surface area of the electrode, i.e. the porosity of the surface of the electrode, can be evaluated by the electrical double layer capacity.

The electrical double layer capacity varies depending upon the temperature at the time of the measurement and the kind and concentration of the electrolyte solution, and on the potential and the electrical double layer capacity in the specification means values measured by the following method.

A test piece (electrode) was immersed in an aqueous solution of 35 wt.% of NaOH at 25° C. and a platinum electrode having platinum black coat (platinized platinum plate) having a specific area of about 100 times of the area of the test piece was immersed forming a pair of electrodes and a cell-impedance in the condition is measured by an impedance meter to obtain an electrical double layer capacity.

Various methods for coating the surface layer on the electrode, for example, a composite coating method, a melt spraying method, or a sintering method can be employed.

Particularly preferred is the composite coating method.

In the composite coating method, electroplating is carried out with the electrode substrate as a cathode, in a plating bath prepared by suspending the particles composed essentially of e.g. nickel, in an aqueous solution containing a metal ion which forms a metal matrix, whereby the metal and the particles are codeposited on the electrode substrate.

When a nickel layer is formed as the metal layer, it is possible to use a plating bath such as a Watts bath, a sulfamate bath, Weisberg bath, a nickel chloride bath, a nickel chloride sulfate bath, a nickel chloride-nickel acetate bath, a nickel sulfate bath, a hard nickel bath, a nickel fluoborate bath, a nickel phosphate bath and a nickel alloy bath.

When a cobalt layer is formed as the metal layer, it is possible to use a plating bath such as a cobalt chloride bath, a cobalt sulfamate bath, a cobalt ammonium sulfate bath, a cobalt sulfate bath and a cobalt soluble organic acid salt bath.

When a silver layer is formed as the metal layer, it is possible to use a silver plating bath (AgCN 36 g/l; KCN 60 g/l and $K_2CO_3$ 15 g/l).

It is preferable to use the above-mentioned baths. However, the bath is not critical and various nickel plating baths, cobalt plating baths and silver plating baths can be used.

Especially, in the case of the Ni plating bath or the Co plating bath, the pH of the bath is preferably adjusted to fall within a range of from 1.5 to 4.5. The reason is that particles containing Ni or Co usually have oxygen attached on their surfaces and when the particles are applied to the electrode substrate, the attached oxygen impairs the bonding strength of the particles to the electrode substrate, and for the removal of the attached oxygen from the surface of the particles in the electroplating bath, it is preferred that the bath has a pH of from 1.5 to 4.5.

The same effect is also effectively obtainable when Cl ions are present in the bath. In this case, the concentration of Cl ions in the bath is preferably at least 135 g/l.

A better effect is obtainable when the pH is adjusted to fall within a range of from 1.5 to 4.5 and at the same time the concentration of Cl ions is adjusted to be at least 135 g/l.

Specific preferred embodiments for obtaining an electrodeposited composite coating will be described.

An electrode substrate is immersed in a bath containing dispersed particles composed essentially of a metal selected from nickel, cobalt and silver, and electroplating is carried out while vibrating a vibration plate disposed in the bath and stirring the bath with a bubbler, or electroplating is carried out while circulating the plating bath between the plating tank and the reservoir tank for the plating bath at a linear velocity of the bath of from 5 to 300 cm/sec.

When the former method is employed, the frequency of the vibrations is from 5 to 500 cycles/min., preferably from 10 to 300 cycles/min., more preferably from 50 to 150 cycles/min., the amplitude of the vibrations is from 5 to 30%, preferably from 10 to 25%, more preferably from 15 to 25%, of the height of the plating tank, and the amount of the bubbling gas is from 0.1 to 100 l/min., preferably from 1 to 50 l/min., more preferably from 5 to 35 l/min., per 1 $cm^2$ of the bottom surface area of the plating tank.

In the latter method, the linear velocity of the bath is preferably from 10 to 200 cm/sec., more preferably from 15 to 120 cm/sec.

The proportion of the particles in the bath is preferably within a range of from 1 to 200 g/l so as to provide a satisfactory bonding condition for the particles to be desposited on the electrode surface. During the dispersion plating operation, the temperature is kept preferably within a range of from 20° to 80° C. and the current density is maintained within a range of from 1 to 20 $A/dm^2$.

An additive to reduce the distortion, an additive to facilitate the co-deposition or the like may, of course, be added to the plating bath.

Further, in order to enhance the bonding strength of the particles to the metal layer, heating treatment or a further Ni plating subsequent to the composite coating may also optionally be carried out.

Thus, an electrode having the particles bonded thereto by the metal layer is obtainable.

A remarkable reduction of the cell voltage can be obtained with use of the above electrode. In order to further reduce the cell voltage, it is effective to further deposit a noble metal or a noble metal oxide on the above electrode.

Such a noble metal or its oxide is the one capable of being readily deposited on the exposed particles and capable of being uniformly deposited on the entire electrode surface even if it is applied in a very small amount, and coupled with the electrochemical activity of the exposed particles, it is further capable of reducing the overvoltage synergistically.

Preferred examples of such a noble metal or its oxide include known noble metals such as platinum, rhodium and iridium, their alloys and oxides and a mixture of these oxides.

The amount of the noble metal or its oxide to be deposited on the electrode having the exposed particles on its surface, may be as small as from 1 to 100 mg, preferably from 5 to 50 mg, as calculated as the noble metal, per 1 $cm^2$ of the apparent surface area of the electrode. If the amount is less than 1 mg, the synergistic effect to reduce the overvoltage is not adequate. On the other hand, even if an amount greater than 100 mg is used, no further increase in the synergistic effect is obtainable.

The method for applying the noble metal or its oxide onto the electrode surface is not critical. For instance, an aqueous solution of a noble metal salt may be sprayed or coated on the electrode surface or the electrode may be dipped in such an aqueous solution to deposit the salt on the electrode, and then heat is applied to decompose the salt to form the noble metal or to form its oxide, or heat is conducted in a hydrogen gas stream to form the noble metal. Or it is also possible to carry out electroplating or electroless plating in an aqueous solution of a noble metal salt to deposit the noble metal on the electrode surface.

Further, it is possible to apply a noble metal oxide by coating a slurry of the noble metal oxide or by dipping the electrode in such a slurry.

It has been found that the noble metal or its oxide thus deposited provides an unexpected by superior effect.

Namely, during the electrolysis of water, the effect to remarkably improve the durability i.e. the effective life, of the electrode, as well as the above-mentioned effect to reduce the overvoltage, is remarkable as the effect attributable to the deposition of the noble metal or its oxide.

An example of the preferred method for producing an anode to be used in the present invention will be illustrated. As such an anode, (1) the one obtained by the codeposition of Raney nickel as disclosed in Japanese Laid-Open Patent Application No. 112785/1979 or (2) the one obtained by depositing a noble metal or its oxide as mentioned above, is preferably used.

In the case of the above-mentioned method (1), the electrochemically active anode particles can be made of an alloy of the first metal and the second metal or a leached alloy obtained by removing at least a part of the second metal component from said alloy.

The anode thus obtained can be used as the gas evolution anode in various fields, but it is especially effective as an anode for electrolysis of water.

When the electrode described in the foregoing is employed as an anode for the electrolysis of water, if desired, it is treated with an alkali metal hydroxide (for example, by immersing it in an aqueous solution of an alkali metal hydroxide) to remove at least a part of the metal component other than Ni, Co and Ag in the alloy particles, and thereby to make the particles porous.

In the treatment, the concentration of the aqueous solution of an alkali metal hydroxide as NaOH is preferably in a range of from 5 to 40 wt.% and the temperature is preferably from 20° to 150° C.

A cation exchange membrane provided on its surface with a gas and liquid permeable non-electrochemically active porous layer having a thickness thinner than the membrane as disclosed in Japanese Laid-Open Patent Application No. 75583/81 can advantageously be used. With use of a cation exchange membrane of this type, even when it is brought in contact with the electrode, the membrane per se is spaced from the electrode for a distance corresponding to the thickness of the porous layer formed on the membrane surface, whereby the above-mentioned effect can adequately be obtained. As an additional advantage, the evolved gas can readily be removed as disclosed in said Laid-Open Patent Application.

Now, the present invention will be described in further details with reference to the Examples.

EXAMPLE 1

Powdery unleached Raney nickel (Ni: 50 wt.%, Al: 50 wt.%) was dispersed in an amount of 10 g/l into a nickel chloride with ($NiCl_2.6H_2O$: 300 g/l, $H_3BO_3$: 38 g/l). The dispersion thus obtained and having a pH of 2.2 was supplied to an electroplating tank. The electroplating tank had a perforated plate movable up-and-down at the bottom of the tank, and a bubbler was disposed above the perforated plate, to discharge a gas such as nitrogen.

At both side parts of the tank, nickel electrodes (i.e. anodes) having the same surface area were provided, and at the central part of the tank, a plate to be electroplated (i.e. an iron expanded metal) connected to a negative power source was disposed.

Electroplating was carried out while vibrating the perforated plate at an amplitude of 20% of the height of the tank and at a frequency of 100 cycles/min. and blowing nitrogen gas out of the bubbler at a rate of 10 l/min per 1 $dm^2$ of the bottom surface area of the tank. The electroplating was conducted at a temperature of 40° C., at a current density of 3 $A/dm^2$ for one hour. The electroplated composite coating thereby obtained had a thickness of about 150μ, and was uniform over the entire surface, and the content of the Raney nickel in the layer was 30 wt.%.

The electroplated plate thus obtained was treated in a 20% NaOH aqueous solution at 80° C. for one hour.

The anode thus obtained was then disposed at the anode side of the cation exchange membrane composed of a copolymer of polytetrafluoroethylene with $CF_2=CFO(CF_2)_3COOCH_3$ and having an ion exchange capacity of 1.45 meq/g dry resin and a thickness of 210μ, and the electrode likewise prepared in accordance with the above-mentioned manner was disposed as a cathode at the cathode side, whereby a electrolytic cell for the electrolysis of water was assembled.

Electrolysis was carried out at 90° C. at a current density of 20 $A/dm^2$ by supplying a 30% KOH aqueous solution to the anode compartment and water to the cathode compartment, while maintaining the KOH concentration in the anode and cathode compartments at a level of 20%.

The oxygen overvoltage at the anode was measured with use of a Luggin capillary tube and SCE as a standard electrode, and it was found to be about 0.21 V. Whereas, the oxygen overvoltage of a flat nickel plate was 0.44 V.

During the above electrolysis of water, the cell voltage was 1.8 V, and when the electrolysis was continued for 30 days, no change was observed in the cell voltage.

EXAMPLE 2

Powdery unleached Raney nickel (Ni: 50 wt.%, Al: 50 wt.%) was dispersed in an amount of 10 g/l into a nickel chloride bath ($NiCl_2.6H_2O$: 300 g/l, $H_3BO_3$: 38 g/l). With use of the dispersion thus obtained and having a pH of 2.0, electroplating was carried out by means of a plating apparatus. The plating apparaus had a reservoir tank for the dispersion and a means for supplying the dispersion from the reservoir tank to the bottom of the plating tank by means of a pump, and at both side parts of the plating tank, nickel electrodes (i.e. anodes) were disposed, and at the center part thereof, an iron plate to be plated connected to a negative power source was disposed. The dispersion was circulated between the reservoir tank and the plating tank. The electroplating was conducted in the plating apparatus at a current density of 3 $A/dm^2$ for 30 minutes while circulating the dispersion having a pH of 2.0 and a temperature of 40° C. at an ascending velocity in the plating tank being 70 cm/sec. The electroplated layer was grayish black and had a uniform thickness of about 70μ, and the Raney nickel content in the electroplated layer was about 33 wt.%. The electroplated plate was treated in a 20% NaOH aqueous solution at 80° C. for one hour.

A cation exchange membrane provided on its surface with a porous layer was prepared in the same manner as in Example 1 of Japanese Laid-Open Application No. 75583/81 except that the thickness of the membrane was 210μ.

Electrolysis of water was carried out in the same manner as in Example 1 with use of the anode and the cation exchange membrane thus prepared. The oxygen overvoltage was 0.21 V, and the cell voltage was 1.60 V, and after continuous electrolysis for 30 days, no change was observed in the cell voltage.

EXAMPLE 3

A Co coated anode was prepared with use of the same electroplating apparatus as in Example 1 and in the same manner as in Example 1 except that a cobalt bath ($CoSO_4.7H_2O$: 330 g/l, $H_3BO_3$: 30 g/l, $CoCl_2.6H_2O$: 30 g/l, 35° C., pH 4.5) was used as the electroplating bath, Co-Al alloy particles (Co: 50 wt.%, Al: 50 wt.%, the average particle size: 30$\mu$) were used as the particles, the proportion of the particles in the bath was 50 g/l and the cation exchange membrane of Example 2 was used as the cation exchange membrane.

Electrolysis of water was conducted in the same manner as in Example 1 with use of the Co coated anode thus obtained as the anode, whereby the cell voltage was 1.65 V and after continuous electrolysis for 30 days, no change was observed in the cell voltage.

The oxygen overvoltage at the anode was 0.26 V.

EXAMPLE 4

Electrolysis was conducted in the same manner as in Example 3 except that the cobalt bath in Example 3 was replaced by a bath composition of $CoCl_2.6H_2O$: 300 g/l, $H_3BO_3$: 38 g/l (pH: 2.2, the temperature: 45° C.).

As a result, the oxygen overvoltage at the anode was 0.23 V, and the cell voltage was 1.62 V, and after continuous electrolysis for 30 days, no change was observed in the cell voltage.

EXAMPLE 5

A silver coated anode was prepared in the same manner as in Example 1 except that a silver bath (AgCN: 100 g/l, KCN: 100 g/l, $K_2CO_3$: 15 g/l, KOH: 3 g/l) was used as the bath, leached Raney silver particles were dispersed as the particles in the bath in an amount of 100 g/l, the electroplating was conducted at a current density of 6 A/dm$^2$, at 50° C. for 60 min. and the cation exchange membrane of Example 2 was used as the cation exchange membrane.

Electrolysis of water was conducted in the same manner as in Example 1 with use of the silver coated anode, whereby the cell voltage was 1.55 V and after continuous electrolysis for 30 days, no change was observed in the cell voltage.

The overvoltage at the anode was 0.16 V.

EXAMPLE 6

Powdery unleached Raney nickel (Ni: 50 wt.%, Al: 50 wt.%) was dispersed in an amount of 10 g/l into a nickel chloride bath ($NiCl_2.6H_2O$: 300 g/l, $H_3DO_3$: 38 g/l). The dispersion thus obtained and having a pH of 2.2 was supplied to an electroplating tank. The electroplating tank had a perforated plate movable up-and-down at the bottom of the tank, and a bubbler to blow out a gas such as nitrogen was disposed above the perforated plate.

At both side parts of the tank, nickel electrodes (i.e. anodes) having the same surface area were provided, and at the center part of the tank, a plate to be electroplated (i.e. an iron expanded metal) connected to a negative power source was disposed.

Electroplating was carried out while vibrating the perforated plate at an amplitude of 20% of the height of the tank and at a frequency of 100 cycles/min. and blowing nitrogen gas out of the bubbler at a rate of 10 l/min. per 1 dm$^2$ of the bottom surface area of the tank. The electroplating was conducted at 40° C., at a current density of 3 A/dm$^2$ for one hour. The electroplated layer thus obtained had a thickness of about 150$\mu$ and was uniform over the entire surface, and the amount of the Raney nickel particles contained therein was 30 wt.%.

The electrode thus obtained was dipped in an aqueous solution containing 4 g/l of chloroplatinic acid, then dried and reduced in a $H_2$ stream at 300° C. to platinum. The amount of the deposition of platinum was about 10 mg/dm$^2$.

The plated plate thus obtained was treated in a 20% NaOH aqueous solution at 80° C. for one hour.

A cathode was prepared by conducting electrodeposition of Raney nickel alloy particles in the same manner as in the case of the above anode, followed by the same treatment in an aqueous NaOH solution without depositing the noble metal.

Then, a cation exchange membrane provided on its surface with a porous layer was prepared in the same manner as in Example 1 of Japanese Laid-Open Patent Application No. 75583/81 except that the thickness of the ion exchange membrane was 210$\mu$.

The above anode was disposed at the anode compartment side of the cation exchange membrane, and the above cathode was disposed at the cathode compartment side, whereby an electrolytic cell for electrolysis of water was assembled.

Electrolysis was conducted at 90° C. by supplying a 30% KOH aqueous solution to the anode compartment and water to the cathode compartment while maintaining the KOH concentration in the anode and cathode compartments at a level of 20%.

The cell voltage was 1.55 V, and after continuous electrolysis for 30 days, no change was observed in the cell voltage.

The oxygen overvoltage at the anode was about 0.16 V. Whereas, the oxygen overvoltage of a flat nickel plate was 0.44 V.

EXAMPLE 7

Powdery unleached Raney nickel (Ni: 50 wt.%, Al: 50 wt.%) was dispersed in an amount of 10 g/l into a nickel chloride bath ($NiCl_2.6H_2O$: 300 g/l, $H_3BO_3$: 38 g/l). With use of the dispersion thus obtained and having a pH of 2.0, electroplating was carried out by means of a plating apparatus. The plating apparatus had a reservoir tank for the dispersion and a means for supplying the dispersion from the reservoir tank to the bottom of the plating tank by means of a pump, and at both side parts of the plating tank, nickel electrodes (i.e. anodes) were disposed, and at the center thereof, an iron plate to be electroplated connected to a negative power source was disposed. The dispersion was circulated between the reservoir tank and the plating tank. The electroplating was conducted at a current density of 3 A/dm$^2$ for 30 min. while circulating the dispersion having a pH of 2.0 and a temperature of 40° C. at an ascending velocity in the plating tank being 70 cm/sec. The electroplated layer thereby obtained was grayish black and had a uniform thickness of about 70$\mu$, and the Raney nickel content in the plated layer was about 33 wt.%. This electroplated plate was treated in a 20% NaOH aqueous solution for one hour. An aqueous solution containing 4 g/l of rhodium chloride was sprayed on the electrode thus obtained, then dried, and subjected to reduction in a $H_2$ stream at 400° C. to reduce rhodium ion and to deposit the metal. This operation was repeated twice. The amount of the deposited rhodium was 10 mg/dm².

With use of the anode thus obtained, electrolysis of water was conducted in the same manner as in Example 6.

The cell voltage was 1.56 V, and after continuous electrolysis for 30 days, no change was observed in the cell voltage.

The oxygen overvoltage at the anode was about 0.17 V.

EXAMPLE 8

A Co coated anode was prepared with use of the same plating apparatus as in Example 6 and in the same manner as in Example 6 except that a cobalt bath (CoSO$_4$.7H$_2$O: 330 g/l, H$_3$BO$_3$: 30 g/l, CoCl$_2$.6H$_2$O: 30 g/l, 35° C., pH 4.5) was used as the plating bath, and Co-Al alloy particles (Co: 50 wt.%, Al: 50 wt.%, the average particles size: 30$\mu$) were used as the particles in an amount of 50 g/l in the bath.

Electrolysis of water was carried out in the same manner as in Example 6 with use of the Co coated anode, whereby the cell voltage was 1.60 V and after continuous electrolysis for 30 days, no change was observed in the cell voltage.

The oxygen overvoltage at the anode was about 0.21 V.

EXAMPLE 9

A silver coated anode was prepared in the same manner as in Example 6 except that a silver bath (AgCN: 100 g/l, KCN: 100 g/l, K$_2$CO$_3$: 15 g/l, KOH: 3 g/l) was used as the bath, leached Raney silver particles were dispersed as the particles in the bath in an amount of 100 g/l, and the electroplating was conducted at a current density of 6 A/dm², at 50° C. for 60 min.

With use of this anode, electrolysis of water was conducted in the same manner as in Example 6, whereby the cell voltage was 1.53 V, and after continuous electrolysis for 30 days, no change was observed in the cell voltage.

The oxygen overvoltage at the anode was 0.14 V.

EXAMPLE 10

Electrolysis was conducted in the same manner as in Example 6 except that the aqueous solution containing 4 g/l of chloroplatinic acid was replaced by an aqueous solution containing 2 g/l of chloroplatinic acid. The amount of platinum deposited on the electrode was 5 mg/dm².

The cell voltage was 1.57 V, and after continuous electrolysis for 30 days, no change was observed in the cell voltage.

The oxygen overvoltage at the anode was 0.18 V.

EXAMPLE 11

Electrolysis was conducted in the same manner as in Example 7 except that the aqueous solution containing 4 g/l of rhodium chloride was replaced by an aqueous solution containing 2 g/l of rhodium chloride. The amount of rhodium deposited on the electrode was 5 mg/dm².

The cell voltage was 1.57 V, and after continuous electrolysis for 30 days, no change was observed in the cell voltage.

The oxygen overvoltage at the anode was 0.18 V.

We claim:

1. A method for electrolyzing water in an electrolytic cell having an anode, a cathode, and a cation exchange membrane disposed therebetween, which comprises electrolyzing water in said electrolytic cell, wherein said anode comprises a metal layer formed on an electrode substrate wherein said metal layer comprises at least one metal selected from the group consisting of nickel, cobalt and silver, and wherein said metal layer contains partially exposed particles consisting essentially of at least one metal selected from nickel, cobalt and silver.

2. The method for electrolyzing water according to claim 1 wherein said anode further comprises a noble metal selected from the group consisting of platinum, rhodium or an alloy or an oxide thereof in the amount of 1 to 100 miligrams per square centimeter deposited on the surface of said metal layer of the anode.

3. The method for electrolyzing water according to claim 1, or 2 wherein the cation exchange membrane is provided, on at least one side thereof, with a gas and liquid permeable non-electrode porous layer having a thickness thinner than the membrane.

* * * * *